US012135521B2

(12) United States Patent
Lee et al.

(10) Patent No.: US 12,135,521 B2
(45) Date of Patent: Nov. 5, 2024

(54) TONER CARTRIDGE HAVING FRONT COVER

(71) Applicant: Hewlett-Packard Development Company, L.P., Spring, TX (US)

(72) Inventors: Jeonghyun Lee, Seongnam-si (KR); Jongin Kim, Seongnam-si (KR); Janghyun Son, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 43 days.

(21) Appl. No.: 18/014,739

(22) PCT Filed: Nov. 5, 2020

(86) PCT No.: PCT/US2020/059071

§ 371 (c)(1),
(2) Date: Jan. 5, 2023

(87) PCT Pub. No.: WO2022/010521

PCT Pub. Date: Jan. 13, 2022

(65) Prior Publication Data

US 2023/0273565 A1 Aug. 31, 2023

(30) Foreign Application Priority Data

Jul. 6, 2020 (KR) ........................ 10-2020-0082712

(51) Int. Cl.
*G03G 15/08* (2006.01)
*G03G 21/16* (2006.01)

(52) U.S. Cl.
CPC ..... *G03G 21/1647* (2013.01); *G03G 15/0872* (2013.01); *G03G 15/0875* (2013.01); *G03G 21/1676* (2013.01); *G03G 2221/1654* (2013.01)

(58) Field of Classification Search
CPC ........... G03G 21/1647; G03G 15/0875; G03G 21/1676; G03G 2221/1654
See application file for complete search history.

(56) References Cited

U.S. PATENT DOCUMENTS

| | | | | | |
|---|---|---|---|---|---|
| 3,922,083 | A * | 11/1975 | Freeman | B65H 23/06 399/385 |
| 3,944,148 | A * | 3/1976 | Freeman | B65H 23/06 206/407 |
| 2006/0171744 | A1 | 8/2006 | Ikeda et al. | |
| 2008/0317510 | A1 | 12/2008 | Choi et al. | |
| 2009/0016779 | A1 | 1/2009 | Hwang | |

(Continued)

FOREIGN PATENT DOCUMENTS

| | | | |
|---|---|---|---|
| CN | 110045586 | A | 7/2019 |
| CN | 209858935 | U | 12/2019 |

(Continued)

*Primary Examiner* — Sevan A Aydin

(74) *Attorney, Agent, or Firm* — Foley & Lardner LLP

(57) ABSTRACT

A toner cartridge includes a housing having a first combining portion and a front cover attached to a front end of the housing in a longitudinal direction, wherein the front cover includes a first locking portion to which the first combining portion is to be attached and a notch portion provided in the first locking portion so that the first locking portion is breakable by an external force in a direction in which the front cover is spaced apart from the housing in the longitudinal direction.

14 Claims, 10 Drawing Sheets

(56) References Cited

U.S. PATENT DOCUMENTS

| | | | |
|---|---|---|---|
| 2010/0158575 A1 | 6/2010 | Maeshima et al. | |
| 2010/0329747 A1 | 12/2010 | Kouda | |
| 2013/0315634 A1 | 11/2013 | Uchiyama et al. | |
| 2018/0095381 A1 | 4/2018 | Zhou et al. | |
| 2018/0364619 A1 | 12/2018 | Taniya | |
| 2023/0273566 A1* | 8/2023 | Park | G03G 21/1647 399/262 |

FOREIGN PATENT DOCUMENTS

| | | | | | |
|---|---|---|---|---|---|
| DE | 69817261 | T2 | * | 6/2004 | |
| EP | 2299333 | A2 | | 3/2011 | |
| EP | 3088963 | A1 | * | 11/2016 | G03G 15/0875 |
| JP | 5018413 | B2 | | 9/2012 | |
| JP | 2013-242474 | A | | 12/2013 | |
| JP | 2014-137464 | A | | 7/2014 | |
| KR | 20030064382 | A | * | 7/2003 | |
| WO | 2019/231059 | A1 | | 12/2019 | |

* cited by examiner

TONER CARTRIDGE HAVING FRONT COVER

CROSS-REFERENCE TO RELATED APPLICATIONS

This application is filed under 35 U.S.C. § 371 as a National Stage of PCT International Application No. PCT/US2020/059071, filed Nov. 5, 2020, which claims priority to KR Patent Application No. 10-2020-0082712, filed Jul. 6, 2020, which are incorporated by reference herein in their entireties.

BACKGROUND

An image forming apparatus using an electrophotographic method forms a visible toner image on a photoconductor by supplying toner to an electrostatic latent image formed on the photoconductor, transfers the toner image to a print medium directly or via an intermediate transfer medium, and fixes the transferred toner image onto the print medium.

The image forming apparatus may include a toner cartridge detachable from a main body. The toner cartridge is replaced when the lifespan of the toner cartridge terminates. That is, when all toner contained inside the toner cartridge is consumed, the toner cartridge may be removed from the main body, and a new toner cartridge may be mounted in the main body.

DETAILED DESCRIPTION

Figure 1:
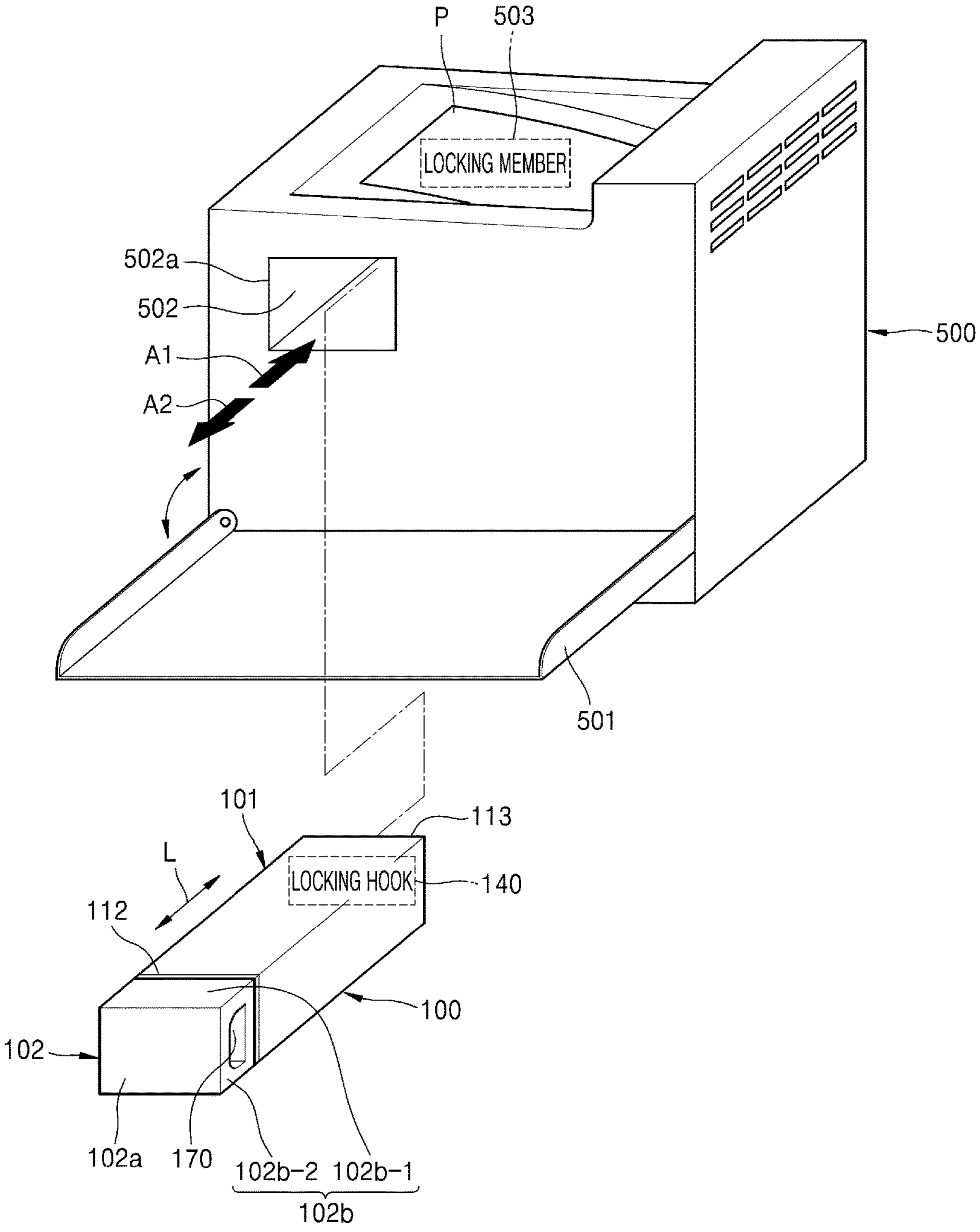
FIG. 1 is a schematic perspective view of an example of an image forming apparatus.

An image forming apparatus for printing an image on a print medium by an electrophotographic method includes a replaceable toner cartridge. The toner cartridge contains a developer. The developer may include toner and may also include toner and carrier.

When the toner cartridge is mounted on a main body of the image forming apparatus, the toner cartridge is locked in the main body to prevent random replacement of the toner cartridge. To unlock and remove the toner cartridge from the main body, a user inputs a toner cartridge replacement command into the image forming apparatus through an input device of the image forming apparatus or through a host connected to the image forming apparatus.

However, when the user pulls the toner cartridge in a removal direction to randomly remove the toner cartridge while the toner cartridge is locked in the main body, a locking device may be broken. Random removal of the toner cartridge may include removing the toner cartridge without first unlocking the toner cartridge from the main body. The random removal direction may include a direction in which the toner cartridge is moved to separate the toner cartridge from the main body.

The toner cartridge of the present example includes a housing and a front cover combined with (that is, attached to) an end of the housing. The front cover is combined with (or attached to) the housing by a breakable combining structure. When an external force applied in a direction of removing the toner cartridge from the main body acts on the front cover, the combining structure is broken and the front cover is separated from the housing. The external force may be greater than a force for removing the toner cartridge while the toner cartridge is unlocked. The external force may be less than a force for breaking the locking device.

The front cover may be combined with (or attached to) the housing by an elastic combining structure that is elastically deformed. One or more cut grooves are formed in the front cover to partially separate the elastic combining structure from the other area of the front cover so that the elastic combining structure is easily uncombined by the external force. As a result of such an elastic combining structure, the toner cartridge may remain locked in the main body, and breakage of the locking device may be prevented. Also, random replacement of the toner cartridge may be prevented.

Hereinafter, examples of a toner cartridge will be described with reference to the accompanying drawings. In the drawings, the same reference numerals refer to components having the same functions, and the size of each component may be exaggerated for clarity and convenience of description.

FIG. 1 is a schematic perspective view of an example of an image forming apparatus. Referring to FIG. 1, the image forming apparatus may include a main body 500 and a toner cartridge 100 that is detachably attached to the main body 500. The main body 500 may include a printing unit for printing an image on a print medium P by an electrophotographic method. Toner to be supplied to the main body 500 is contained in the toner cartridge 100.

As an example, the printing unit may include an optical scanner, a developing device, a transfer unit, and a fuser. The developing device may include a photosensitive drum and a developing roller. The optical scanner forms an electrostatic latent image by irradiating light corresponding to image information on a surface of the photosensitive drum charged with a uniform surface electric potential. The developing roller supplies toner contained in the developing device to the electrostatic latent image to develop the electrostatic latent image into a visible toner image. The transfer unit transfers, to the print medium P, the toner image formed on the photosensitive drum. The toner image transferred to the print medium P remains attached to the print medium P by an electrostatic force. When the print medium P passes through the fuser, the toner image is fixed to the print medium P by heat and pressure. The print medium P on which printing is completed is discharged to the outside of the main body 500.

The toner cartridge 100 may be connected to the developing device to supply toner to the developing device. The toner cartridge 100 is detachably attached to the image forming apparatus. The main body 500 may include a mounting portion 502 and a locking member 503. When a door 501 is opened to open a part of the main body 500, an entrance 502*a* of the mounting portion 502 is exposed. The toner cartridge 100 may be mounted on the main body 500 by aligning the toner cartridge 100 with the entrance 502*a* of the mounting portion 502 and sliding the toner cartridge 100 in a mounting direction A1. Also, the toner cartridge 100 may be removed from the main body 500 by sliding the toner cartridge 100 in a removal direction A2. The mounting direction A1 and the removal direction A2 may be a longitudinal direction L of the toner cartridge 100. When the toner cartridge 100 is mounted on the main body 500, the locking member 503 is attached (for example, hooked) to a locking hook 140 provided on the toner cartridge 100 to lock the toner cartridge 100 so that the toner cartridge 100 is not removed.

Figure 2:
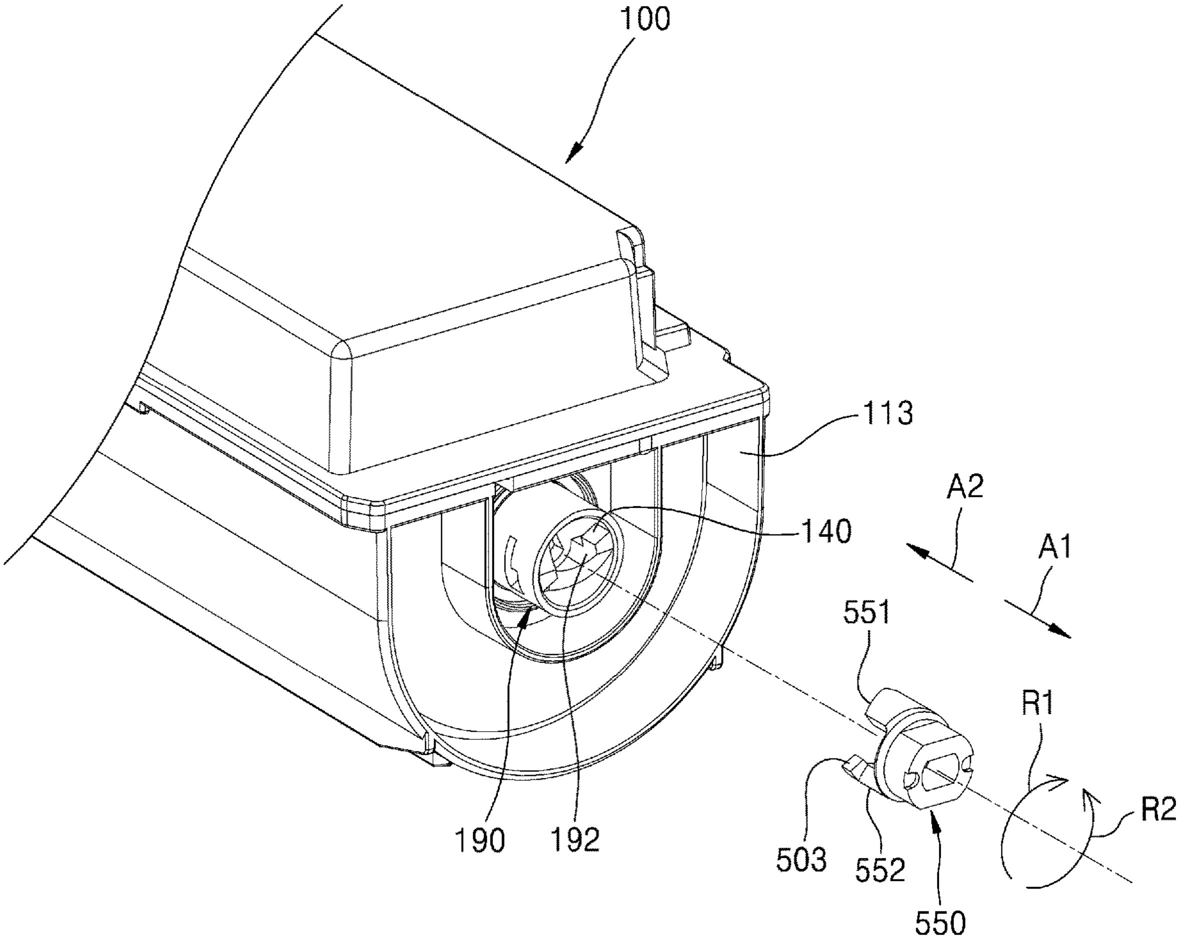
FIG. 2 is a partially exploded perspective view showing an example of a locking structure.

FIG. 2 is a partially exploded perspective view showing an example of a locking structure. Referring to FIG. 2, the locking structure may include the locking member 503 provided on the main body 500 and the locking hook 140 provided on the toner cartridge 100. When the toner cartridge 100 is mounted on the main body 500, the toner cartridge 100 is connected to a motor (not shown) provided on the main body 500 by a coupling structure and receives rotation power from the motor, so that the motor rotates a rotation member inside the toner cartridge 100. The rotation member may include, for example, one or more transporting members for transporting toner inside the toner cartridge 100 to a toner outlet. The coupling structure may include a driving coupler 550 provided in the main body 500 and a driven coupler 190 provided in the toner cartridge 100. The driving coupler 550 may include a rotation power transmitting portion 552. The driven coupler 190 may include a rotation power receiving portion 192 for receiving the rotation power from the rotation power transmitting portion 552. When the toner cartridge 100 is mounted on the mounting portion 502 of the main body 500, the rotation power transmitting portion 552 and the rotation power receiving portion 192 face each other in a rotation direction. When the driving coupler 550 is rotated in a first rotation direction R1, the rotation power transmitting portion 552 pushes the rotation power receiving portion 192 in the first rotation direction R1. Therefore, the driven coupler 190 is rotated in the first rotation direction R1.

As an example, the locking member 503 and the locking hook 140 may be provided on the driving coupler 550 and the driven coupler 190, respectively. The locking member 503 may extend from the rotation power transmitting portion 552 in a circumferential direction. The locking hook 140 may extend from the rotation power receiving portion 192 in a circumferential direction. When the locking member 503 and the locking hook 140 are displaced from each other in a rotation direction, the toner cartridge 100 is mounted on the mounting portion 502 of the main body 500. When the toner cartridge 100 reaches a mounting location, the rotation power transmitting portion 552 and the rotation power receiving portion 192 face each other in a rotation direction. When the driving coupler 550 is slightly rotated in the first rotation direction R1, the locking hook 140 is hooked to the locking member 503. In other words, the locking member 503 and the locking hook 140 face each other in the removal direction A2. Therefore, the toner cartridge 100 may not be moved in the removal direction A2 and may be locked in the mounting location. When the driving coupler 550 is continuously rotated in the first rotation direction R1, the rotation power transmitting portion 552 pushes the rotation power receiving portion 192 in the first rotation direction R1, and the driven coupler 190 is rotated in the first rotation direction R1.

The toner cartridge 100 needs to be unlocked to be removed from the mounting portion 502. For example, when the remaining amount of toner inside the toner cartridge 100 reaches a replacement reference amount, a replacement signal recognizable by a user may be output through an output device (not shown), for example, a display, a buzzer, a lighting device, or the like, to replace the toner cartridge 100. The replacement signal may be, for example, an image signal displayed on the display, a sound signal through the buzzer, a light signal through the lighting device, or the like. The user may input an operation for requesting replacement of the toner cartridge 100 through an operation panel, for example. A controller (not shown) may guide, for example, an operation procedure of the user for replacing the toner cartridge 100 through the display, and the user may replace the toner cartridge 100 according to the guide. To prevent random replacement of the toner cartridge 100, the operation procedure may include an input of passwords. The controller slightly rotates the driving coupler 550 in a second rotation direction R2, which is an opposite direction of the first rotation direction R1, according to the user's operation. In this case, the locking member 503 is unhooked from the locking hook 140, and the toner cartridge 100 is changed into a state in which the toner cartridge 100 may be moved in the removal direction A2. The main body 500 may be provided with a pop-up structure for slightly pushing the toner cartridge 100 in the removal direction A2 after the toner cartridge 100 is unlocked. For example, the pop-up structure may have various structures such as an actuator and a cam structure that are driven in the removal direction A2.

When the toner cartridge 100 is pulled in the removal direction A2 while the toner cartridge 100 is not unlocked, the locking member 503 and/or the locking hook 140 may be broken, and the driving coupler 550, a driving portion provided in the main body 550 to drive the driving coupler 550, or the driven coupler 190 may be broken. When the locking member 503, the locking hook 140, the driving coupler 550, the driven coupler 190, or the like that is broken remains inside the main body 500, time and cost are needed to repair the image forming apparatus. The toner cartridge 100 of the present example has a structure capable of preventing the cartridge 100 from being removed while the toner cartridge 100 is not unlocked.

Figure 3:
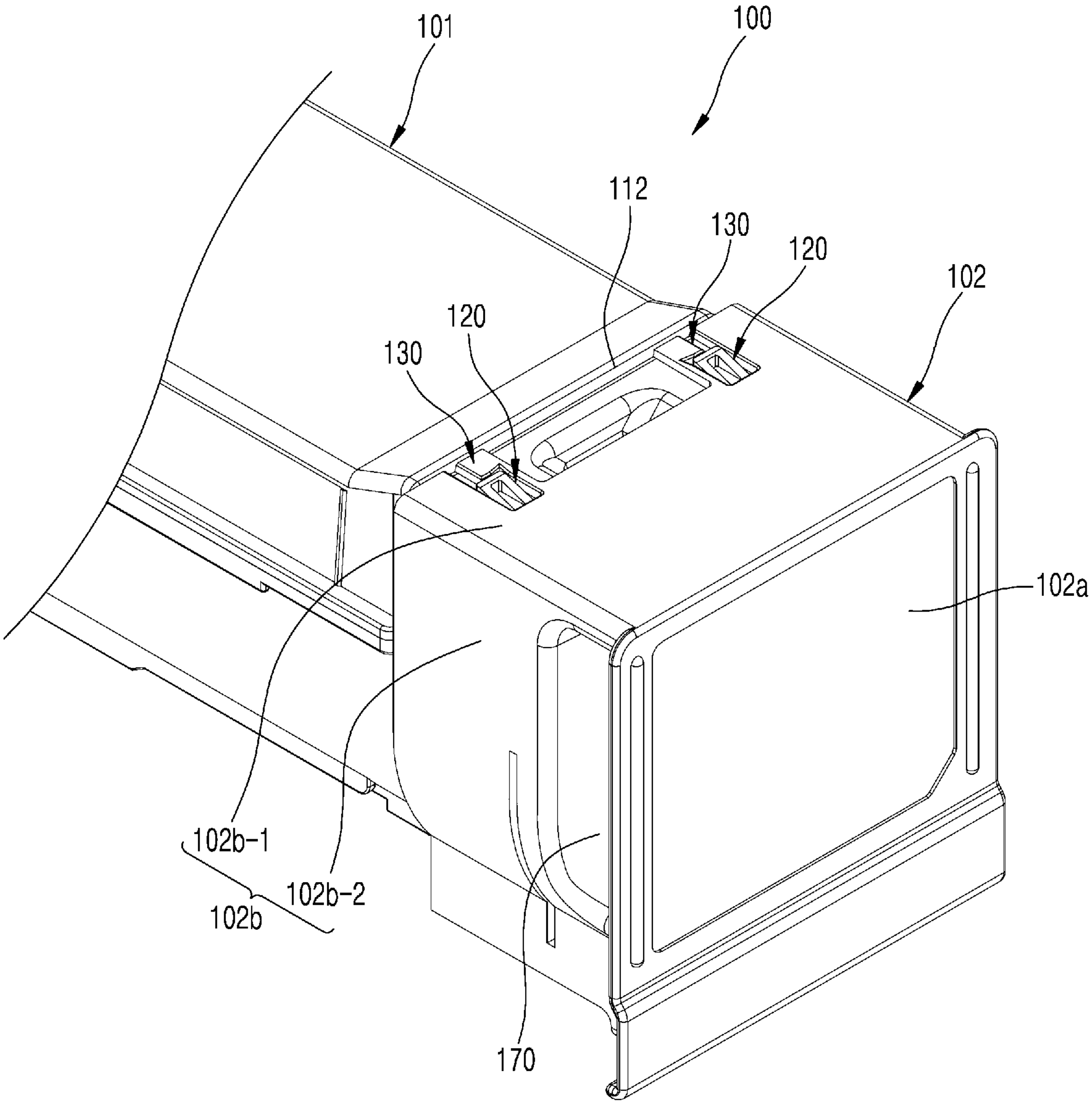
FIG. 3 is a schematic perspective view of an example of a removal preventing structure.
Figure 4:
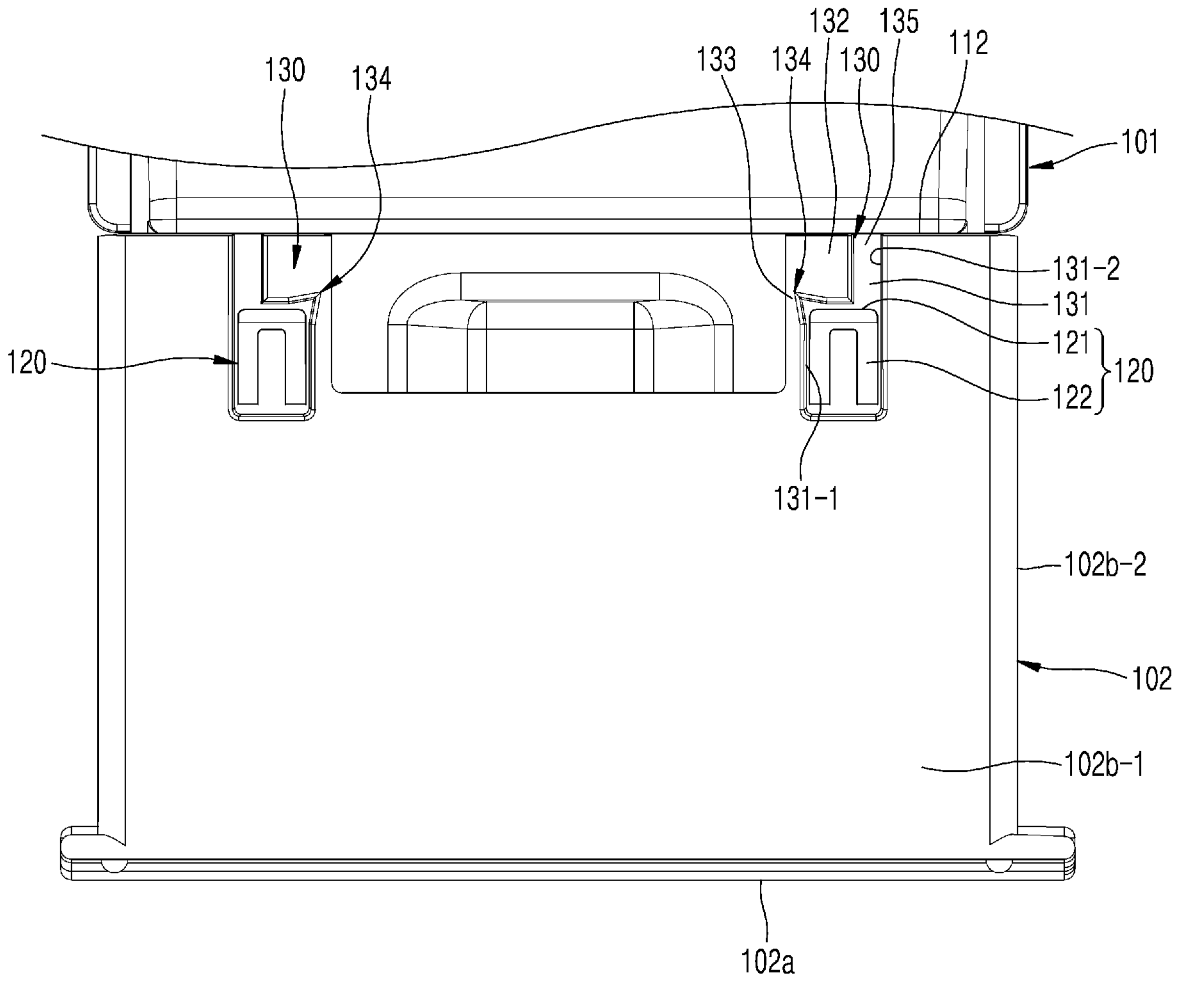
FIG. 4 is a plan view of an example of the removal preventing structure illustrated in FIG. 3.

FIG. 3 is a schematic perspective view of an example of a removal preventing structure. FIG. 4 is a plan view of an example of the removal preventing structure shown in FIG. 3. Referring to FIGS. 1, 3, and 4, in the removal preventing structure of the present example, a combining structure of a housing 101 and a front cover 102 is broken by an external force acting on the front cover 102 in the removal direction A2 while the toner cartridge 100 is locked in the main body 500.

An example of the toner cartridge 100 includes the housing 101 provided with a combining portion (a first combining portion) 120 and the front cover 102 combined with a front end 112 of the housing 101 in the longitudinal direction L. The front cover 102 may have a locking portion (a first locking portion) 130 to which the combining portion 120 is hooked and a notch portion 134 included in the locking portion 130 to enable the locking portion 130 to be broken by an external force applied in a direction in which the front cover 102 is spaced apart from the housing 101 in the longitudinal direction L.

The housing 101 may have a cylindrical shape extending in the longitudinal direction L to contain toner therein. The housing 101 has the front end 112 and a rear end 113 opposite to the front end 112 in the longitudinal direction L. The front cover 102 is combined with the front end 112. The front cover 102 may have a front wall 102*a* facing the front end 112 of the housing 101 and a sidewall 102*b* extending from the front wall 102*a* toward the front end 112 of the housing 101. The sidewall 102*a* may be provided with a handle 170. The handle 170 may be formed by being sunken inward from the sidewall 102*b*. The sidewall 102*b* may include a first sidewall 102*b*-1 in a vertical direction and a second sidewall 102*b*-2 in a transverse direction. The handle 170 may be formed by being sunken in the second sidewall 102*b*-2.

The front cover 102 is combined with the front end 112 of the housing 101 by the combining portion 120 and the locking portion 130. The combining portion 120 may be provided at the front end 112 of the housing 101. The combining portion 120 may include a combining protrusion 121 of which an end 122 toward the front end 112 protrudes and which is downwardly inclined from the end 122 toward the front cover 102. The locking portion 130 may be included on the sidewall 102. The locking portion 130 may be provided on a sidewall on which the handle 170 is not provided, from among the first sidewall 102*b*-1 and the second sidewall 102*b*-2. In the present example, the handle 170 is provided on the second sidewall 102*b*-2, and the locking portion 130 is provided on the first sidewall 102*b*-1. The locking portion 130 may include an insertion hole 131 into which the combining protrusion 121 is inserted and a hook portion 132 which extends from a first edge 131-1 in a direction orthogonal to the longitudinal direction L of the insertion hole 131 toward a second edge 131-2 opposite to the first edge 131-1 and is hooked to the end 122 of the combining protrusion 121 toward the housing 101. The hook portion 132 may be spaced apart from the second edge 131-2. As a result, a gap 135 is formed between the hook portion 132 and the second edge 131-2, and the hook portion 132 is connected to the first edge 131-1 by a connecting portion 133. In the present example, the first edge 131-1 is an edge opposite to the adjacent handle 170 on the basis of the second edge 131-2. Although not shown in the drawings, the hook portion 132 may extend from an edge adjacent to the handle 170, i.e., the second edge 131-2, toward the first edge 131-1 and may be spaced apart from the first edge 131-1.

The hook portion 132 may include the notch portion 134 to enable the hook portion 132 to be broken by an external force. The notch portion 134 may be located adjacent to the connecting portion 133. The notch portion 134 partially reduces thickness, for example, sharply, of the hook portion 132 so that the hook portion 132 is broken in the notch portion 134 when an external force in the removal direction A2 acts on the hook portion 132. The notch portion 134 may be formed so that the combining protrusion 121 may be detached from the insertion hole 131 when the hook portion 132 is broken. In the present example, the notch portion 134 is formed to form an acute angle to the connecting portion 133 close to the first edge 131-1 of the insertion hole 131. Since the hook portion 132 is broken at a location close to the first edge 131-1 of the insertion hole 131, the combining protrusion 121 may be easily detached from the insertion hole 131 after the hook portion 132 is broken. A size and a shape of the notch portion 134 are determined so that the hook portion 132 is not broken by an external force acting on the front cover 102 to remove the toner cartridge 100 when the toner cartridge 100 is unlocked. The size and shape of the notch portion 134 may be determined such that the hook portion 132 may be broken before the magnitude of the external force acting on the front cover 102 reaches the magnitude at which the locking member 503 or the locking hook 140 is broken.

Figure 5:
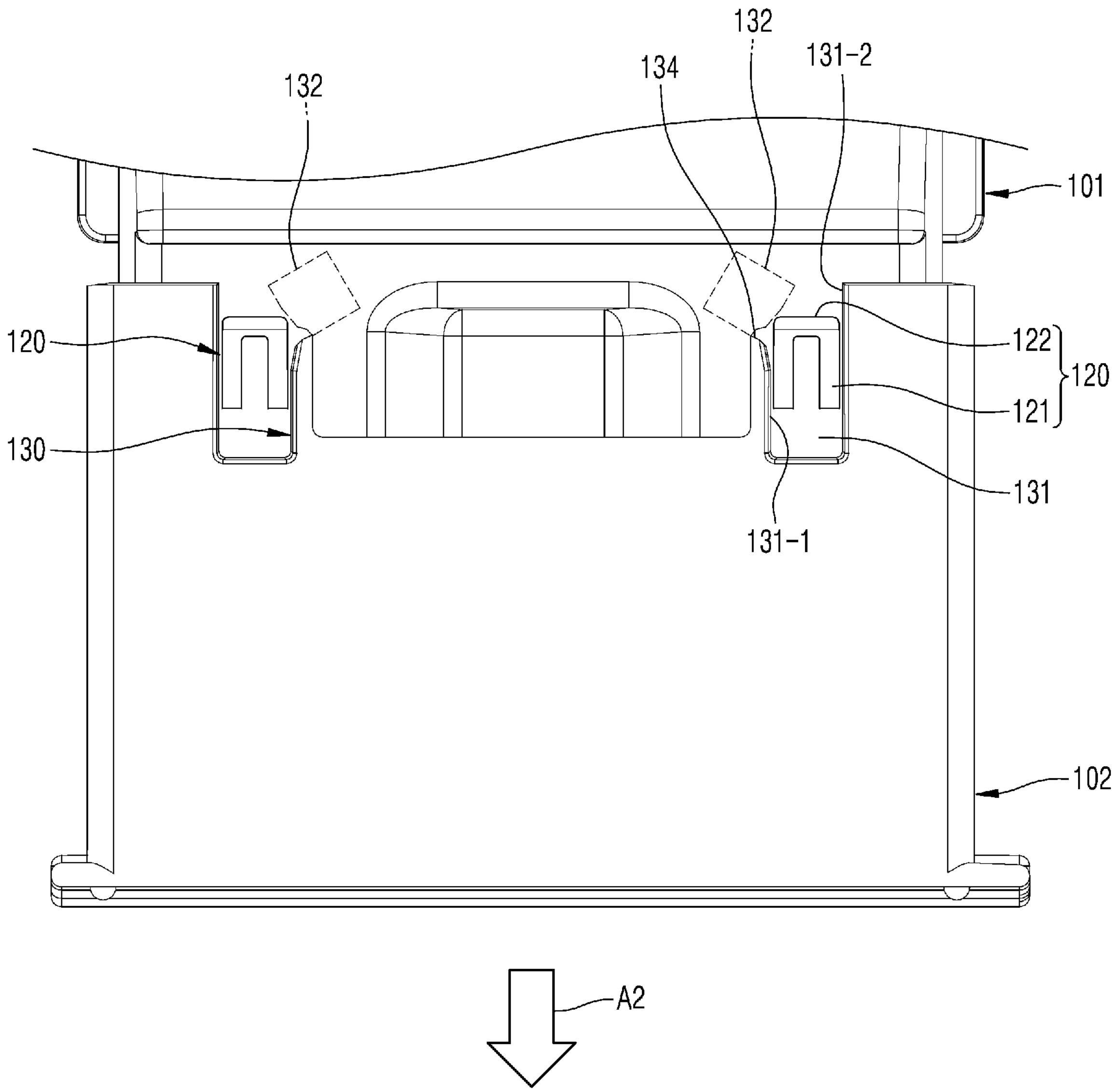
FIG. 5 is a view showing an operation of an example of the removal preventing structure shown in FIGS. 3 and 4.

FIG. 5 is a view showing an operation of an example of the removal preventing structure shown in FIGS. 3 and 4. When the toner cartridge 100 is mounted on the mounting portion 502, the locking member 503 of the main body 500 is hooked to the locking hook 140 of the toner cartridge 100 so that the toner cartridge 100 is locked in the main body 500. In this state, although the handle 170 is pulled in the removal direction A2 to randomly remove the toner cartridge 100, the toner cartridge 100 does not move in the removal direction A2. Since the hook portion 132 contacts the end 122 of the combining protrusion 121, an external force pulling the handle 170 in the removal direction A2 acts on the hook portion 132. When the external force is increased, a crack is generated in the notch portion 134, and the hook portion 132 is broken and detached from the first edge 131-1. In this case, the combining protrusion 121 is detached from the insertion hole 131, and the front cover 102 is separated from the housing 101.

According to the example structure described above, when the toner cartridge 100 is locked in the main body 500, the toner cartridge 100 may be prevented from being randomly removed. Also, when the front cover 102 is pulled to randomly remove the toner cartridge 100, the front cover 102 is separated from the housing 101. Therefore, the locking member 503, the locking hook 140, the coupling structure, or the like may be prevented from being broken.

When the toner cartridge 100 is mounted on the mounting portion 502 of the main body 500, the front cover 102 may be located parallel to the entrance 502*a* of the mounting portion 502. In other words, the front wall 102 of the front cover 102 is aligned with the entrance 502*a*. The sidewall 102*b* of the front cover 102 is inserted into the mounting portion 502. Since the handle 170 provided on the sidewall 102*b* is not exposed to the outside, random removal of the toner cartridge 100 may be prevented.

A new front cover 102 may be combined with the housing 101 instead of the separated front cover 102. For example, when the combining protrusion 121 and the insertion hole 131 are aligned and the front cover 102 is pushed toward the front end 112 of the housing 101, the hook portion 132 is elastically lifted upwards along an inclined surface of the combining protrusion 121, and the combining protrusion 121 is inserted into the insertion hole 131. When the end 122 of the combining protrusion 121 is hooked to the hook portion 132, the front cover 102 is combined with the housing 101.

When a user wants to remove the toner cartridge 100, the user may input, via an operation panel, an operation to request replacement of the toner cartridge 100. A controller (not shown) unhooks the locking member 503 from the locking hook 140 by slightly rotating the driving coupler 550 in the second rotation direction R2 which is a direction opposite to the first rotation direction R1. In this state, the user holds the handle 170 and pulls the toner cartridge 100 in the removal direction A2. Since the toner cartridge 100 is unlocked, although the handle 170 is pulled in the removal direction A2, the front cover 102 is not separated from the housing 101 but remains combined with the housing 101.

Therefore, the toner cartridge 100 may be pulled in the removal direction A2 and removed from the main body 500. When a pop-up structure is provided, the toner cartridge 100 is unlocked and slightly pushed in the removal direction A2. In this case, the handle 170 may be exposed to the outside of the mounting portion 502.

Figure 6:
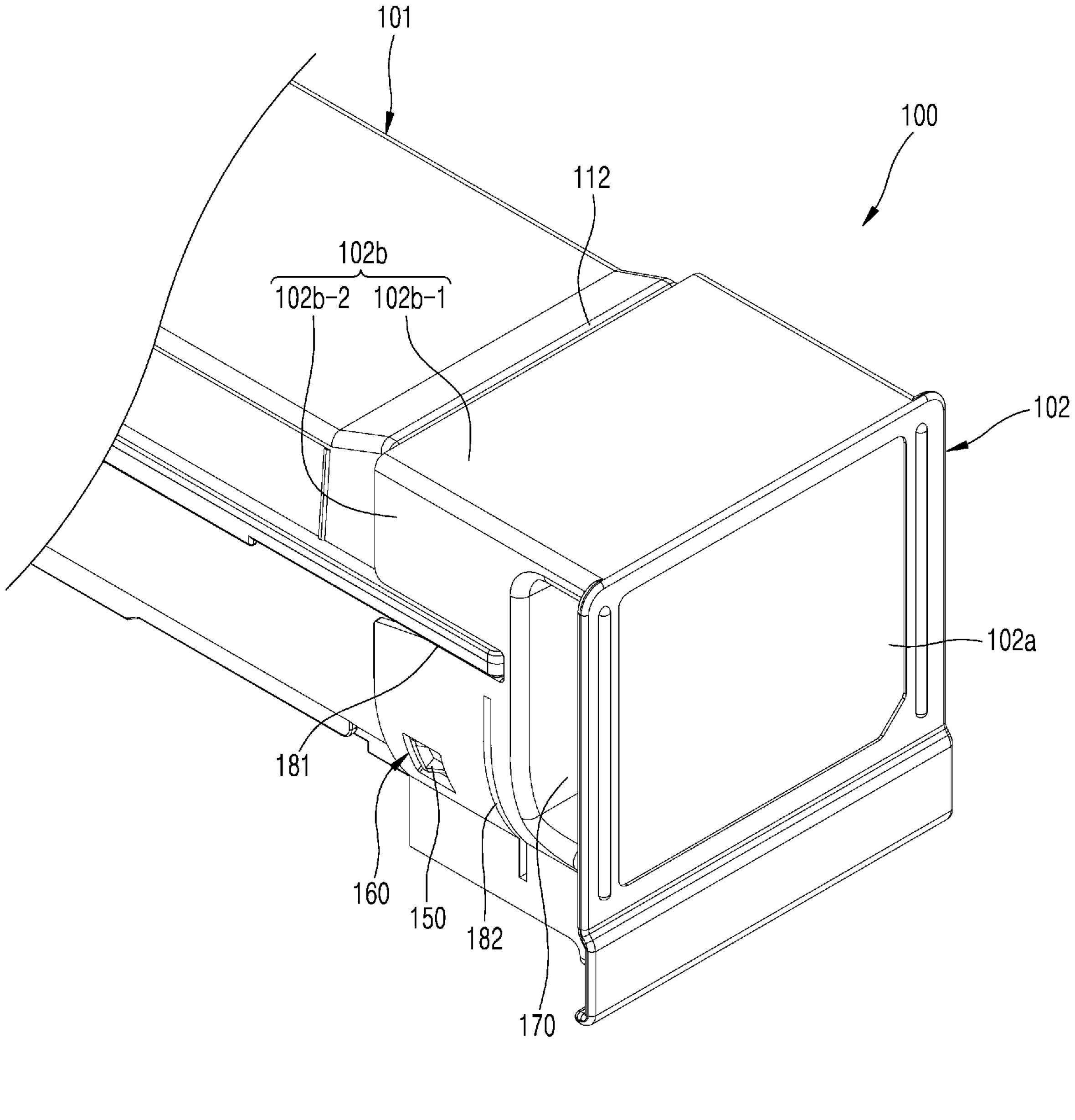
FIG. 6 is a schematic perspective view of an example of a removal preventing structure.
Figure 7:
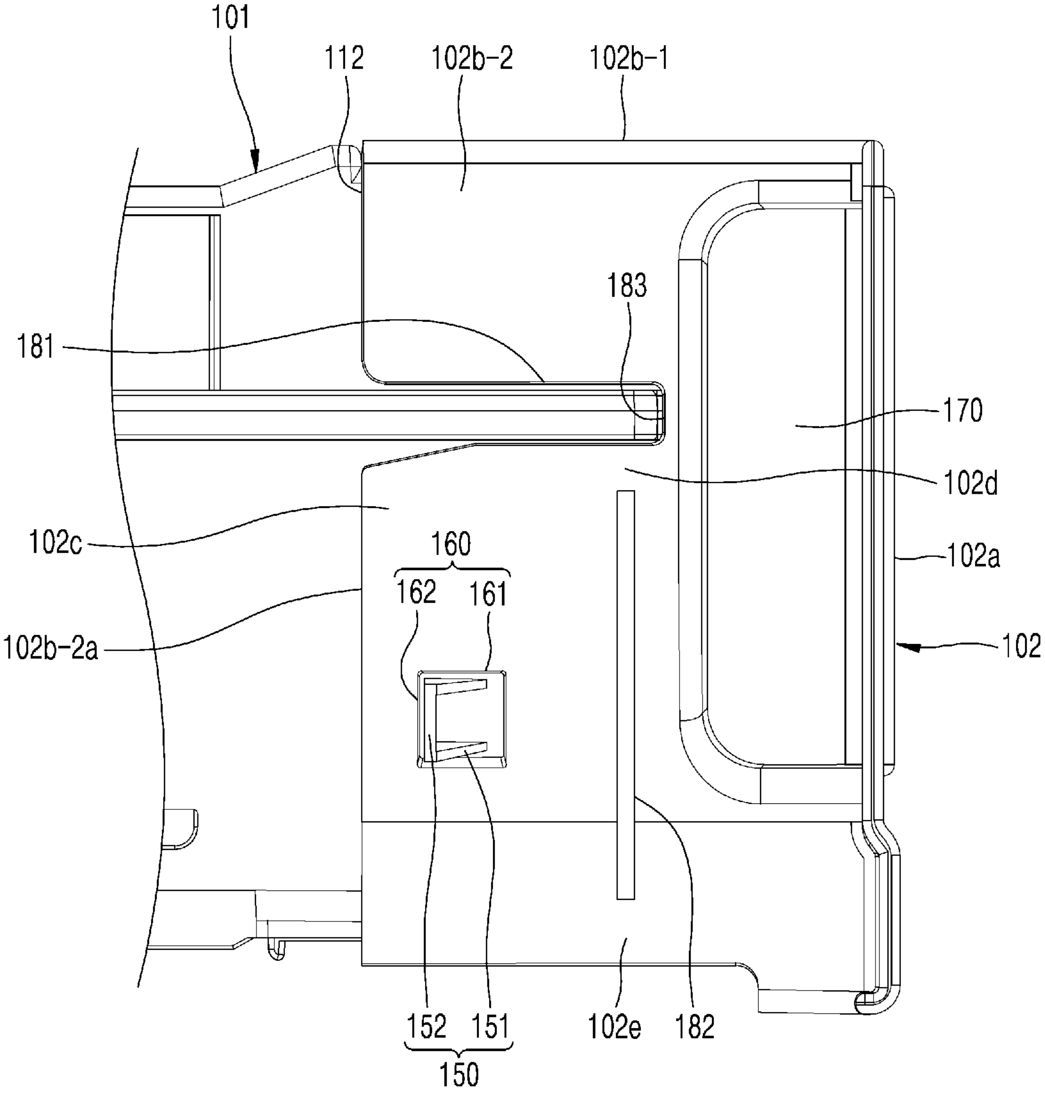
FIG. 7 is a side view of an example of the removal preventing structure shown in FIG. 6.

FIG. 6 is a schematic perspective view of an example of a removal preventing structure. FIG. 7 is a side view of an example of the removal preventing structure shown in FIG. 6. The removal preventing structure of the present example is configured such that an elastic combining structure is easily uncombined by an external force in a removal direction A2 in a structure in which a front cover 102 is combined with a housing 101 by an elastic combining method. Referring to FIGS. 6 and 7, an example of a toner cartridge 100 may include the housing 101 provided with a combining portion (a second combining portion) 150 and the front cover 102 having a front wall 102*a* facing a front end 112 of the housing 101 in a longitudinal direction L, a sidewall 102*b* extending from the front wall 102*a* toward the housing 101 in the longitudinal direction L, a locking portion (a second locking portion) 160 provided on the sidewall 102*b* to lock the combining portion 150 therein, and a first cut portion 181 cut from an edge 102*b*-2*a* of the sidewall 102*b* toward the front end 112 of the housing 101 to a location beyond the locking portion 160 toward the front wall 102.

The housing 101 may have a cylindrical shape extending in the longitudinal direction L to contain toner therein. The front cover 102 is combined with the front end 112 of the housing 101. The front cover 102 may have the front wall 102*a* facing the front end 112 of the housing 101 and the sidewall 102*b* extending from the front wall 102*a* toward the front end 112 of the housing 101. The sidewall 102*b* may be provided with a handle 170. The handle 170 may be formed by being sunken inward from the sidewall 102*b*. The sidewall 102*b* may include a first sidewall 102*b*-1 in a vertical direction and a second sidewall 102*b*-2 in a transverse direction. The handle 170 may be formed by being sunken in the second sidewall 102*b*-2.

The combining portion 150 may include a combining protrusion 151 in a form in which the protrusion amount decreases toward the front cover 102 from an end 152 that protrudes outwards from an outer wall of the housing 101. The locking portion 160 may be provided on the sidewall 102*b*. In the present example, the locking portion 160 is provided on the second sidewall 102*b*-2 in which the handle 170 is formed. The locking portion 160 may be located closer to the housing 101 than the handle 170. The locking portion 160 may include an insertion hole 161 into which the combining protrusion 151 is inserted. An edge 162 of the insertion hole 161 in the longitudinal direction L is hooked to the end 152 of the combining protrusion 151 toward the housing 101.

The first cut portion 181 is formed between the first sidewall 102*b*-1 and the locking portion 160. The first cut portion 181 extends from the edge of 102*b*-2*a* of the second sidewall 102*b*-2 toward the front wall 102*a*. The edge 102*b*-2*a* is an edge of the second sidewall 102*b*-2 close to the front end 112 of the housing 101. In other words, the edge 102*b*-2*a* is an edge of the second sidewall 102*b*-2 opposite to the front wall 102*a*. The first cut portion 181 is formed by cutting the second sidewall 102*b*-2 to the location beyond the locking portion 160 toward the front wall 102*a* in the longitudinal direction L. In the present example, the first cut portion 181 extends toward the front wall 102*a* up to a location in which the end 183 thereof does not reach the handle 170. The second sidewall 102*b*-2 is partially separated from the first sidewall 102*b*-1 by the first cut portion 181. Therefore, a portion of the second sidewall 102*b*-2 in which the locking portion 160 is provided may operate as an elastic plate 102*c* that may be elastically deformed to the outside.

The combining protrusion 151 and the insertion hole 161 are aligned and the front cover 102 is pushed in the longitudinal direction L to combine the front cover 102 with the housing 101. When the edge 102*b*-2*a* of the second sidewall 102*b*-2 contacts an inclined surface of the combining protrusion 151, the elastic plate 102*c* opens outwards and the front cover 102 approaches the front end 112 of the housing 101. When the combining protrusion 151 is inserted into the insertion hole 161, the elastic plate 102*c* returns to an original location thereof, and the end 152 of the combining protrusion 151 contacts an edge 162 of the insertion hole 161. As a result, the front cover 102 is combined with the housing 101.

Figure 8:
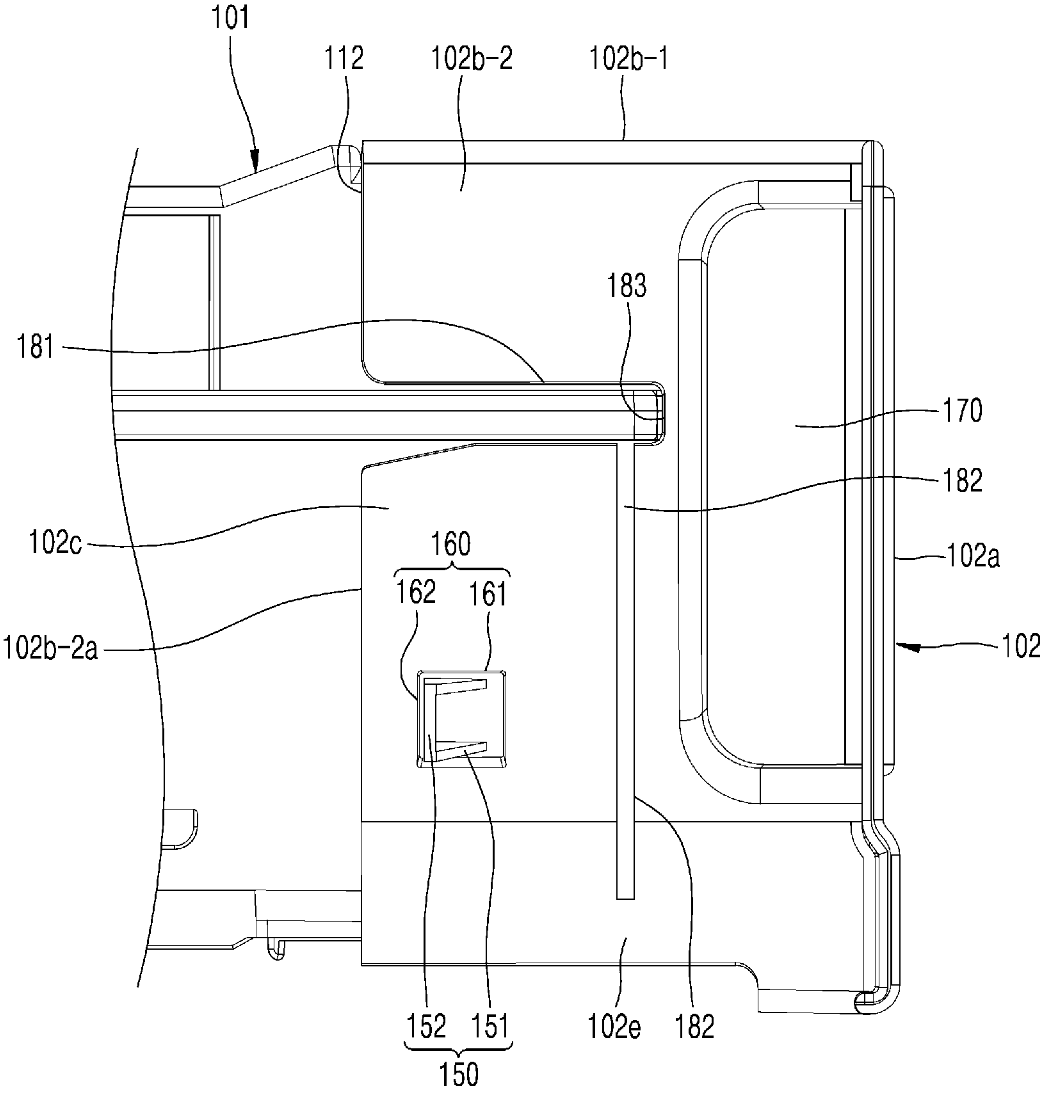
FIG. 8 is a side view of an example of the removal preventing structure shown in FIG. 6.

A second cut portion 182 cut in a vertical direction, i.e., toward the first sidewall 102*b*-1, may be provided between the front wall 102*a* of the second sidewall 102*b*-2 and the locking portion 160. In the present example, the second cut portion 182 is formed between the locking portion 160 and the handle 170. The second cut portion 182 may be spaced apart from the first cut portion 181. A portion 102*d* of the second sidewall 102*b*-2 between the second cut portion 182 and the first cut portion 181 and a portion 102*e* of the second sidewall 102*b*-2 below the second cut portion 182 function as an elastic support portion of the elastic plate 102*c*. Since a length of the elastic support portion is shorter than when the second cut portion 182 does not exist, the elastic plate 102*c* may be further easily deformed to the outside. The length of the second cut portion 182 and a distance between the second cut portion 182 and the first cut portion 182 may be determined so that the elastic plate 102*c* has an appropriate elastic force. The length of the second curt portion 182 and the distance between the second cut portion 182 and the first cut portion 181 may be determined such that the elastic plate 102*c* is opened to the outside to detach the combining portion 150 from the locking portion 160 before the magnitude of an external force acting on the front cover 102 to remove the toner cartridge 100 being locked reaches the magnitude at which the locking member 503 or the locking hook 140 is broken. The length of the second cut portion 182 and the distance between the second cut portion 182 and the first cut portion 181 may be determined such that the combining portion 150 remains hooked to the locking portion 160 by an external force acting on the front cover 102 to remove the toner cartridge 100 being unlocked. FIG. 8 is a side view of an example of the removal preventing structure shown in FIG. 6. As shown in FIG. 8, the second cut portion 182 may be connected to the first cut portion 181. In this case, the elastic plate 102*c* may be opened to the outside even by a smaller external force.

Figure 9:
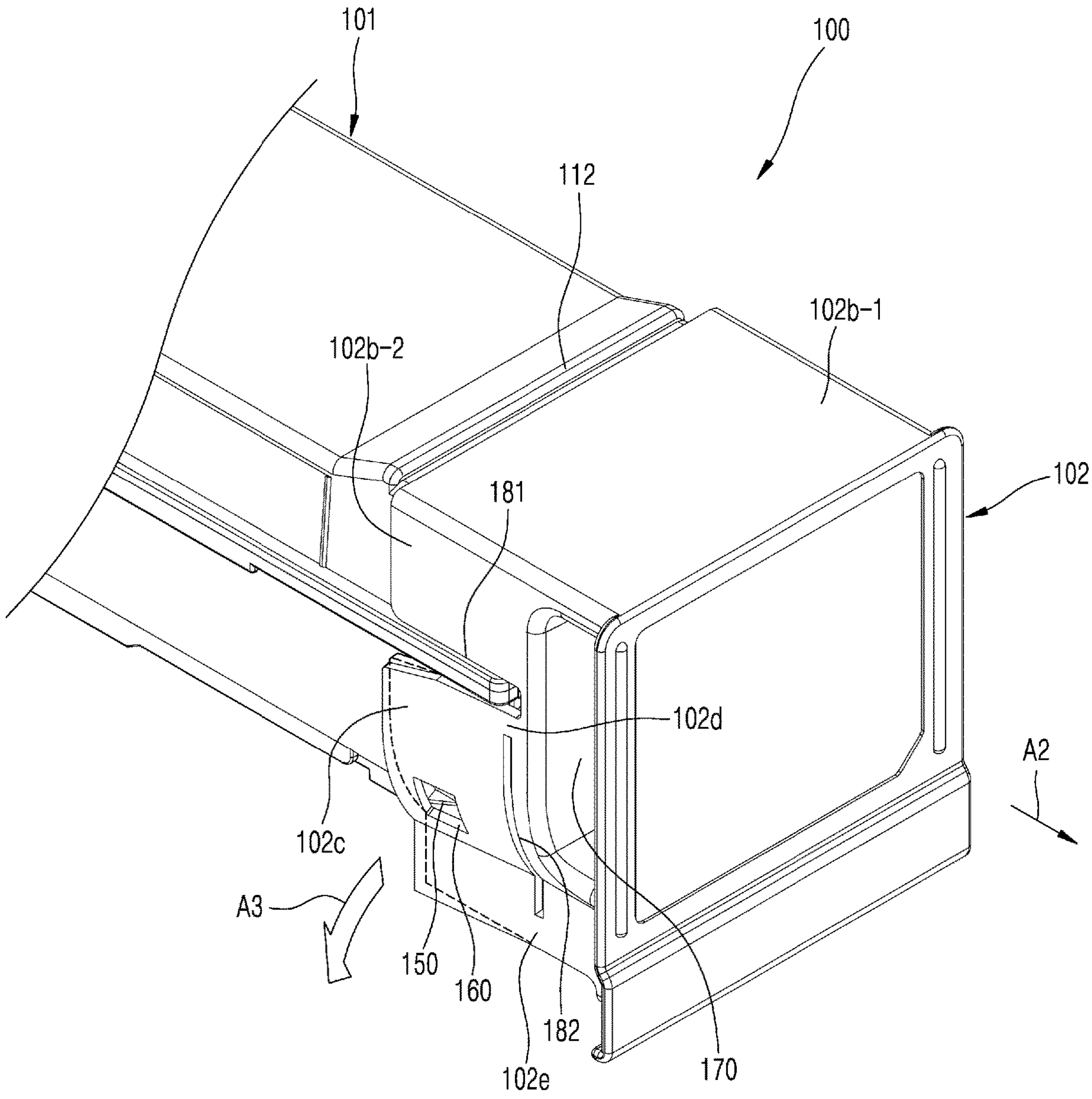
FIG. 9 is a view showing an operation of an example of the removal preventing structure shown in FIGS. 6 through 8.

FIG. 9 is a view showing an operation of an example of the removal preventing structure shown in FIGS. 6 through 8. When the toner cartridge 100 is mounted on the mounting portion 502, the locking member 503 of the main body 500 is hooked to the locking hook 140 of the toner cartridge 100, and the toner cartridge 100 is locked in the main body 500. In this case, although the handle 170 is pulled in the removal direction A2 to randomly remove the toner cartridge 100, the toner cartridge 100 is not moved in the removal direction A2. Instead, as indicated by an arrow A3 in FIG. 9, a portion of the second sidewall 102*b*-2, for example, the elastic plate 102*c*, may be elastically opened to the outside (into a state shown by a slide line) from a state shown by a dotted line, the locking portion 160 may be detached from the combining portion 150, and the front cover 102 may be separated from the housing 101. Therefore, while the toner cartridge 100 is locked in the main body 500, the toner cartridge 100 may be prevented from being randomly removed. Also, when the front cover 102 is pulled to randomly remove the toner cartridge 100, the front cover 102 is separated from the housing 101, and thus, the locking member 503, the locking hook 140, a coupling structure, or the like may be prevented from being broken.

The separated front cover 102 may be recombined with the housing 101. When the combining protrusion 151 and the insertion hole 161 are aligned and the front cover 102 is pushed in the longitudinal direction L, the elastic plate 102*c* is opened to the outside as the edge 102*b*-2*a* of the second sidewall 102*b*-2 contacts an inclined surface of the combining protrusion 151. When the combining protrusion 151 is inserted into the insertion hole 161, the elastic plate 102*c* returns to an original location thereof, the end 152 of the combining protrusion 151 contacts the edge 162 of the insertion hole 161, and the front cover 102 is combined with the housing 101. When the user wants to remove the toner cartridge 100, the user may remove the toner cartridge 100 from the main body 500 by unlocking the toner cartridge 100 according to the above-described operation procedure and pulling the toner cartridge 100 in the removal direction A2 while holding the handle 170. When a pop-up structure is provided, the toner cartridge 100 is unlocked and slightly pushed in the removal direction A2. In this case, the handle 170 may be exposed to the outside of the mounting portion 502.

Figure 10:
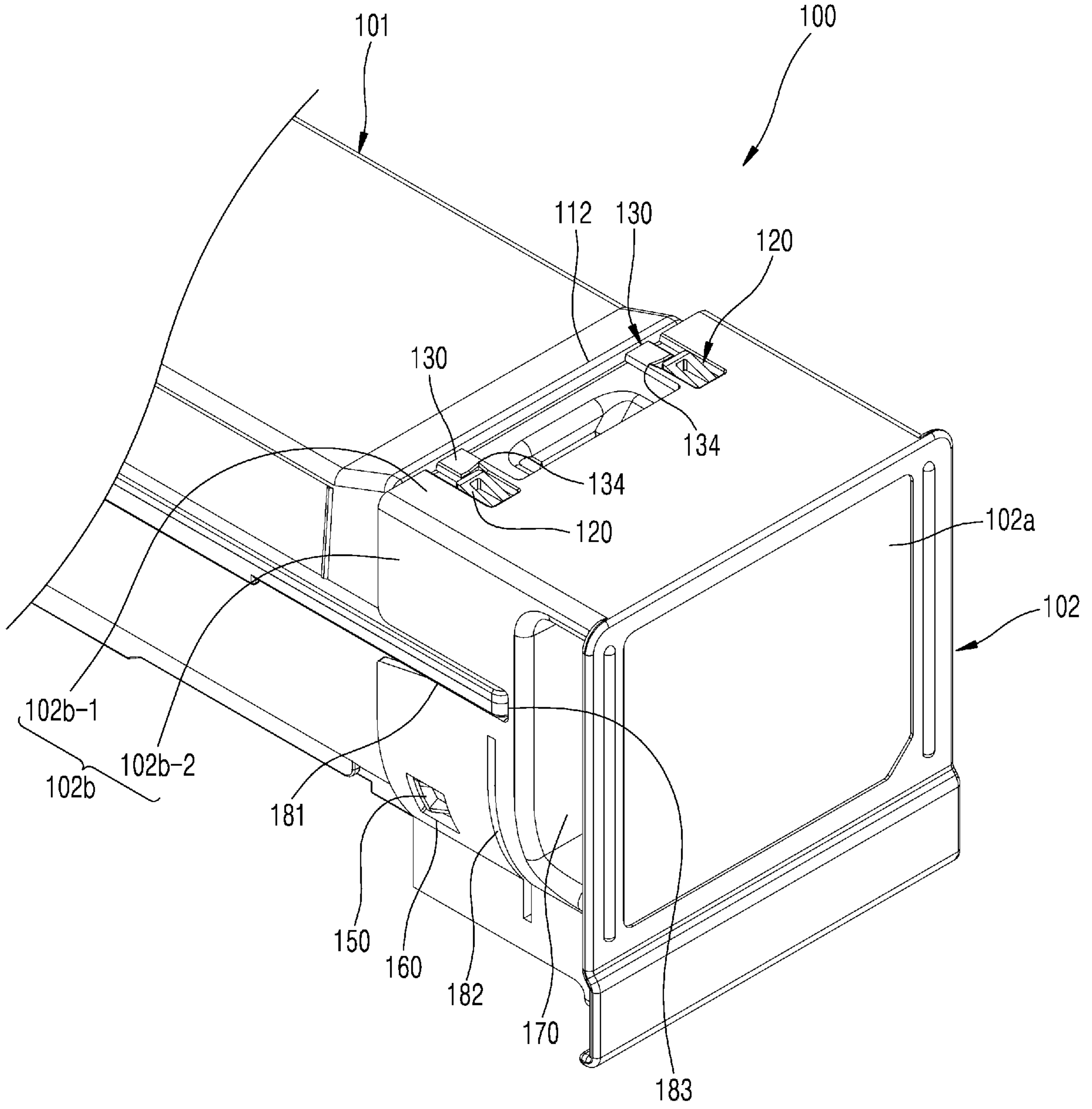
FIG. 10 is a schematic perspective view of an example of a removal preventing structure.

FIG. 10 is a schematic perspective view of an example of a removal preventing structure. The removal preventing structure shown in FIG. 10 includes the removal preventing structure shown in FIGS. 3 and 4 and the removal preventing structure shown in FIGS. 6 through 8. Referring to FIG. 10, a housing 101 includes a first combining portion 120 and a second combining portion 150. A front cover 102 includes a first locking portion 130 to which the first combining portion 120 is hooked and a second locking portion 160 to which the second combining portion 150 is hooked. The front cover 102 may have a front wall 102*a* facing a front end 112 of the housing 101 and a sidewall 102*b* extending from the front wall 102*a* toward the front end 112 of the housing 101. The sidewall 102*b* may include a first sidewall 102*b*-1 in a vertical direction and a second sidewall 102*b*-2 in a transverse direction. The second sidewall 102*b*-2 may include a handle 170. The handle 170 may be formed by being sunken inward from the second sidewall 102*b*-2. The first locking portion 130 is provided on the first sidewall 102*b*-1, and the second locking portion 160 is provided on the second sidewall 102*b*-2. The first combining portion 120 and the first locking portion 130 may have the same shapes as those shown in FIGS. 3 and 4, and the second combining portion 150 and the second locking portion 160 may have the same shapes as those shown in FIGS. 6 and 7.

A notch portion 134 is provided in the first locking portion 130 so that the first locking portion 130 is broken by an external force acting on the front cover 102 in a direction in which the front cover 102 is spaced apart from the housing 101 in the longitudinal direction L. A first cut portion 181 is formed between the first sidewall 102*b*-1 and the second locking portion 160 by extending from an edge 102*b*-2*a* of the second sidewall 102*b*-2 to a location beyond the second locking portions 160 toward the front wall 102*a*. The first cut portion 181 extends up to a location in which an end 183 thereof does not reach the handle 170. Accordingly, a portion of the second sidewall 102*b*-2 in which the second locking portion 160 is provided may operate as an elastic plate 102*c* that may be elastically deformed to the outside. A second cut portion 182 cut in a vertical direction may be provided between the front wall 102*a* and the second locking portion 160 of the second sidewall 102*b*-2, in the present example, between the second locking portion 160 and the handle 170. The second cut portion 182 may be spaced apart from the first cut portion 181 or may be connected to the first cut portion 181 as shown in FIG. 8.

When the toner cartridge 100 is mounted on and locked in the mounting portion 502, although the handle 170 is pulled in a removal direction A2 to randomly remove the toner cartridge 100, the toner cartridge 100 is not moved in the removal direction A2. An external force for pulling the handle 170 in the removal direction A2 acts on the hook portion 132 and the elastic plate 102*c*. When the external force is increased, a crack is generated in the notch portion 134, the hook portion 132 is broken, and the combining protrusion 121 is detached from the insertion hole 131. As the elastic plate 102*c* separated from the first sidewall 102*b*-1 by the first cut portion 181 is elastically opened to the outside, the edge 162 of the insertion hole 161 is detached from the end 152 of the combining protrusion 151. Therefore, the front cover 102 may be separated from the housing 101. According to the structure described above, when the toner cartridge 100 is locked in the main body 500, the toner cartridge 100 may be prevented from being randomly removed. Also, when the front cover 102 is pulled to randomly remove the toner cartridge 100, the front cover 102 is separated from the housing 101, and thus, the locking member 503, the locking hook 140, the coupling structure, or the like may be prevented from being broken.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A toner cartridge comprising:

a housing having a front end and comprising a first combining portion; and a front cover to be attached to the front end of the housing in a longitudinal direction and including a first locking portion to which the first combining portion is to be attached, and a notch portion in the first locking portion so that the first locking portion is breakable by an external force applied in a direction in which the front cover is spaced apart from the housing in the longitudinal direction, wherein the first combining portion includes a combining protrusion, the first locking portion includes an insertion hole into which the combining protrusion is inserted and a hook portion that extends from a first edge of the insertion hole in a direction orthogonal to the longitudinal direction toward a second edge of the insertion hole facing the first edge to be hooked to an end of the combining protrusion toward the housing, and the hook portion is spaced apart from the second edge.

2. The toner cartridge of claim 1, wherein the notch portion forms an acute angle with a connecting portion between the hook portion and the first edge.

3. The toner cartridge of claim 1, wherein the front cover includes a front wall facing the front end of the housing and a sidewall extending from the front wall toward the front end of the housing, and the first locking portion is on the sidewall.

4. The toner cartridge of claim 3, wherein the sidewall includes a first sidewall in a vertical direction and a second sidewall in a transverse direction, and the first locking portion is provided on the first sidewall.

5. The toner cartridge of claim 4, wherein the first edge is opposite to an adjacent handle with respect to the second edge.

6. The toner cartridge of claim 4, wherein the sidewall includes a handle sunken inward.

7. The toner cartridge of claim 4, wherein the housing includes a second combining portion, the second sidewall includes a second locking portion to which the second combining portion is hooked, and a first cut portion is included in the second side wall between the first sidewall and the second locking portion, the first cut portion being cut from an edge of the second sidewall toward the front end of the housing to a location beyond the second locking portion toward the front wall.

8. The toner cartridge of claim 7, wherein a second cut portion cut in the vertical direction is included in the second sidewall between the front wall and the second locking portion.

9. The toner cartridge of claim 8, wherein the second cut portion is spaced apart from the first cut portion.

10. The toner cartridge of claim 8, wherein the second cut portion is connected to the first cut portion.

11. A toner cartridge comprising:

a housing having a front end and comprising a combining portion; and a front cover having a front wall facing the front end of the housing in a longitudinal direction, a sidewall extending from the front wall toward the housing in the longitudinal direction, a locking portion on the sidewall so that the combining portion is to be attached thereto, and a first cut groove cut from an edge of the sidewall toward the front end of the housing to a location beyond the locking portion toward the front wall.

12. The toner cartridge of claim 11, wherein the side wall comprises a second cut portion located between the front wall and the locking portion and cut in a direction orthogonal to the longitudinal direction.

13. The toner cartridge of claim 12, wherein the sidewall includes a first sidewall in a vertical direction and a second sidewall in a transverse direction, and the locking portion, the first cut portion, and the second cut portion are included on the second sidewall.

14. The toner cartridge of claim 13, wherein the second sidewall includes with a handle sunken inward.

* * * * *